(12) United States Patent
Ogawa

(10) Patent No.: US 11,049,220 B2
(45) Date of Patent: Jun. 29, 2021

(54) DISPLAY CONTROL APPARATUS, DISPLAY CONTROL METHOD, AND NON-TRANSITORY COMPUTER READABLE MEDIUM

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 16/460,031

(22) Filed: Jul. 2, 2019

(65) Prior Publication Data

US 2020/0020081 A1    Jan. 16, 2020

(30) Foreign Application Priority Data

Jul. 10, 2018    (JP) .............................. JP2018-130846

(51) Int. Cl.
*G06T 3/60* (2006.01)
*G06T 7/70* (2017.01)

(52) U.S. Cl.
CPC ................ *G06T 3/604* (2013.01); *G06T 7/70* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 5,902,113 A * | 5/1999 | Pryor ..................... | G09B 29/10 283/34 |
| 10,228,766 B2 | 3/2019 | Bhesania et al. | |
| 10,473,980 B2 | 11/2019 | Kim et al. | |
| 10,788,711 B2 | 9/2020 | Kim et al. | |
| 2016/0062166 A1* | 3/2016 | Kim ................... | G02F 1/133634 349/96 |
| 2016/0077592 A1* | 3/2016 | Bhesania ................ | G06F 3/012 345/650 |
| 2017/0034403 A1* | 2/2017 | Seo .......................... | G06T 7/246 |

(Continued)

FOREIGN PATENT DOCUMENTS

| | | |
|---|---|---|
| CN | 102706363 A | 10/2012 |
| CN | 105388659 A | 3/2016 |
| CN | 106796773 A | 5/2017 |

(Continued)

OTHER PUBLICATIONS

Jan. 29, 2021 Chinese Official Action in Chinese Patent Appln. No. 201910621173.8.

(Continued)

*Primary Examiner* — Kevin Ky

(74) *Attorney, Agent, or Firm* — Venable LLP

(57) ABSTRACT

A display control apparatus according to the present invention includes: an axis detection unit configured to detect, based on an image, a rotation axis about which a celestial body included in the image as an object rotates in response to the rotation of the earth; and a control unit configured to perform control such that a partial area of the image is displayed as a display area, and rotation display is performed by changing the display area while changing an angle corresponding to the display area around a position corresponding to the rotation axis detected by the axis detection unit.

11 Claims, 11 Drawing Sheets

(56) References Cited

U.S. PATENT DOCUMENTS

2020/0026111 A1    1/2020  Kim et al.
2020/0252544 A1*   8/2020  Ito ............................ H04N 5/77

FOREIGN PATENT DOCUMENTS

CN    107667524 A    2/2018
JP    2011-040898 A  2/2011

OTHER PUBLICATIONS

"Teacher's Manual: Universe and Earth," pp. 49-55.
U.S. Pat. No. 5,902,113, Cited in Oct. 2, 2020 Official Action.
Teacher's Manual: no date available.

* cited by examiner

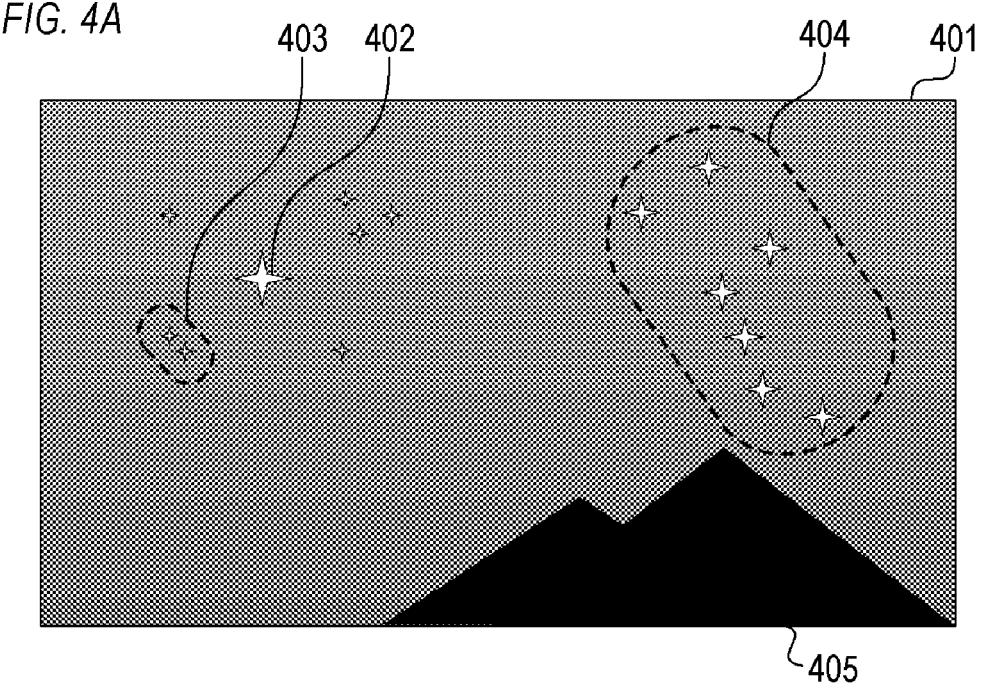

DISPLAY CONTROL APPARATUS, DISPLAY CONTROL METHOD, AND NON-TRANSITORY COMPUTER READABLE MEDIUM

BACKGROUND OF THE INVENTION

Field of the Invention

The present invention relates to a display control apparatus.

Description of the Related Art

In recent years, an imaging apparatus capable of capturing an image having an area wider than the view angle of man such as an omnidirectional image or a celestial sphere image is widely used. In addition, there is also known a method in which display offering a high sense of immersion and a high sense of realism is performed by displaying part of the image having such a wide area in a display unit and changing the area (display area) of the image displayed in the display unit in response to the change of attitude of the apparatus.

Japanese Patent Application Publication No. 2011-40898 discloses a technique in which image reproduction is performed such that, based on direction information at the time of shooting included in a celestial sphere image, a specific direction is displayed as the center of the image. In addition, when the celestial sphere image is reproduced, the celestial sphere image is rotated and displayed while the direction is automatically changed with respect to an axis passing through the zenith and the nadir.

SUMMARY OF THE INVENTION

There are cases where an image of a starry sky is captured using a camera capable of capturing the celestial sphere image. Stars are influenced by the rotation of the earth, and make diurnal motion in which stars revolve westward around the axis of the earth. Polaris is positioned at a location obtained by extending the axis of the earth northward, and hence, particularly in the northern sky, stars seem to move counterclockwise around Polaris. However, even when the conventional art described above is used, the celestial sphere image is only rotated horizontally and displayed while the direction is changed with respect to the axis passing through the zenith and the nadir. Therefore, a viewer cannot easily observe the state of diurnal motion made by stars in the celestial sphere image.

To cope with this, the present invention provides to perform reproduction such that diurnal motion of stars can be easily observed in a celestial sphere image of a starry sky.

The present invention in its first aspect provides a display control apparatus comprising at least one memory and at least one processor which function as:

an axis detection unit configured to detect, based on an image, a rotation axis about which a celestial body included in the image as an object rotates in response to the rotation of the earth; and a control unit configured to perform control such that a partial area of the image is displayed as a display area, and rotation display is performed by changing the display area while changing an angle corresponding to the display area around a position corresponding to the rotation axis detected by the axis detection unit.

The present invention in its second aspect provides a display control method comprising:

detecting, based on an image, a rotation axis about which a celestial body included in the image as an object rotates in response to the rotation of the earth; and performing control such that a partial area of the image is displayed as a display area, and rotation display is performed by changing the display area while changing an angle corresponding to the display area around a position corresponding to the detected rotation axis.

The present invention in its third aspect provides a non-transitory computer readable medium that stores a program, wherein the program causes a computer to execute:

detecting, based on an image, a rotation axis about which a celestial body included in the image as an object rotates in response to the rotation of the earth; and performing control such that a partial area of the image is displayed as a display area, and rotation display is performed by changing the display area while changing an angle corresponding to the display area around a position corresponding to the detected rotation axis.

According to the present invention, it is possible to perform reproduction such that the diurnal motion of stars can be easily observed in the celestial sphere image of the starry sky.

Further features of the present invention will become apparent from the following description of exemplary embodiments with reference to the attached drawings.

BRIEF DESCRIPTION OF THE DRAWINGS

Each of FIG. 1A

DESCRIPTION OF THE EMBODIMENTS

Figure 1A:
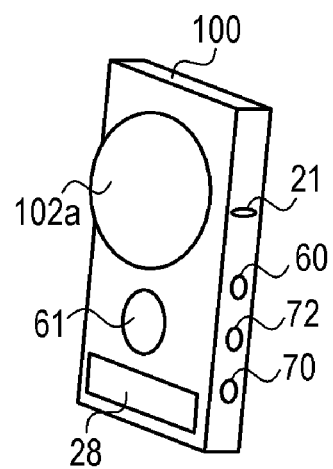
FIG. 1B is an external view of a digital camera according to the present embodiment.
FIG. 1C is a block diagram of the digital camera according to the present embodiment.
Figure 1B:
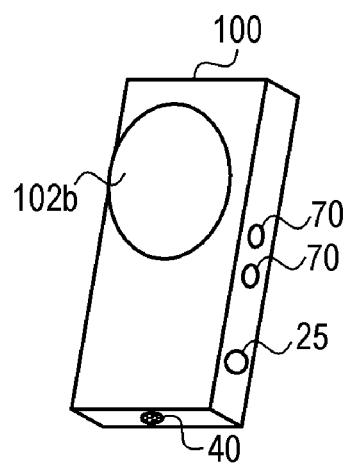

Hereinafter, preferred embodiments of the present invention will be described with reference to the drawings. FIG. 1A is a front perspective view (external view) of a digital camera 100 (imaging apparatus). FIG. 1B is a rear perspective view (external view) of the digital camera 100. The digital camera 100 is a camera (omnidirectional camera; celestial sphere camera) for capturing an omnidirectional image (celestial sphere image).

A barrier 102a is a protective window for a front camera unit that has a range ahead of the digital camera 100 as a shooting range. The front camera unit is, e.g., a wide-angle camera unit that has, as the shooting range, a wide range of not less than 180 degrees in each of an up-and-down direction and a left-and right direction ahead of the digital camera 100. A barrier 102b is a protective window for a rear camera unit that has a range behind the digital camera 100 as a shooting range. The rear camera unit is, e.g., a wide-angle camera unit that has, as the shooting range, a wide range of not less than 180 degrees in each of the up-and-down direction and the left-and-right direction behind the digital camera 100.

A display unit 28 displays images and various information. A shutter button 61 is an operation unit (operation member) for providing a shooting instruction. A mode switching switch 60 is an operation unit for switching among various modes. A connection I/F 25 is a connector for connecting a connection cable to the digital camera 100, and external apparatuses such as a smart phone, a personal computer, and a television apparatus are connected to the digital camera 100 by using the connection cable. Operation units 70 are various switches, buttons, dials, or touch sensors for receiving various operations from a user. A power source switch 72 is a push button for switching a power source between ON and OFF states.

A light-emitting unit (light-emitting member) 21 is a light-emitting diode (LED) or the like, and the light-emitting unit 21 notifies the user of various states of the digital camera 100 by using light emission patterns and colors of emitted light. A fixing unit 40 is, e.g., a tripod screw hole, and is used for fixing and installing the digital camera 100 with a fixing device such as a tripod.

Figure 1C:
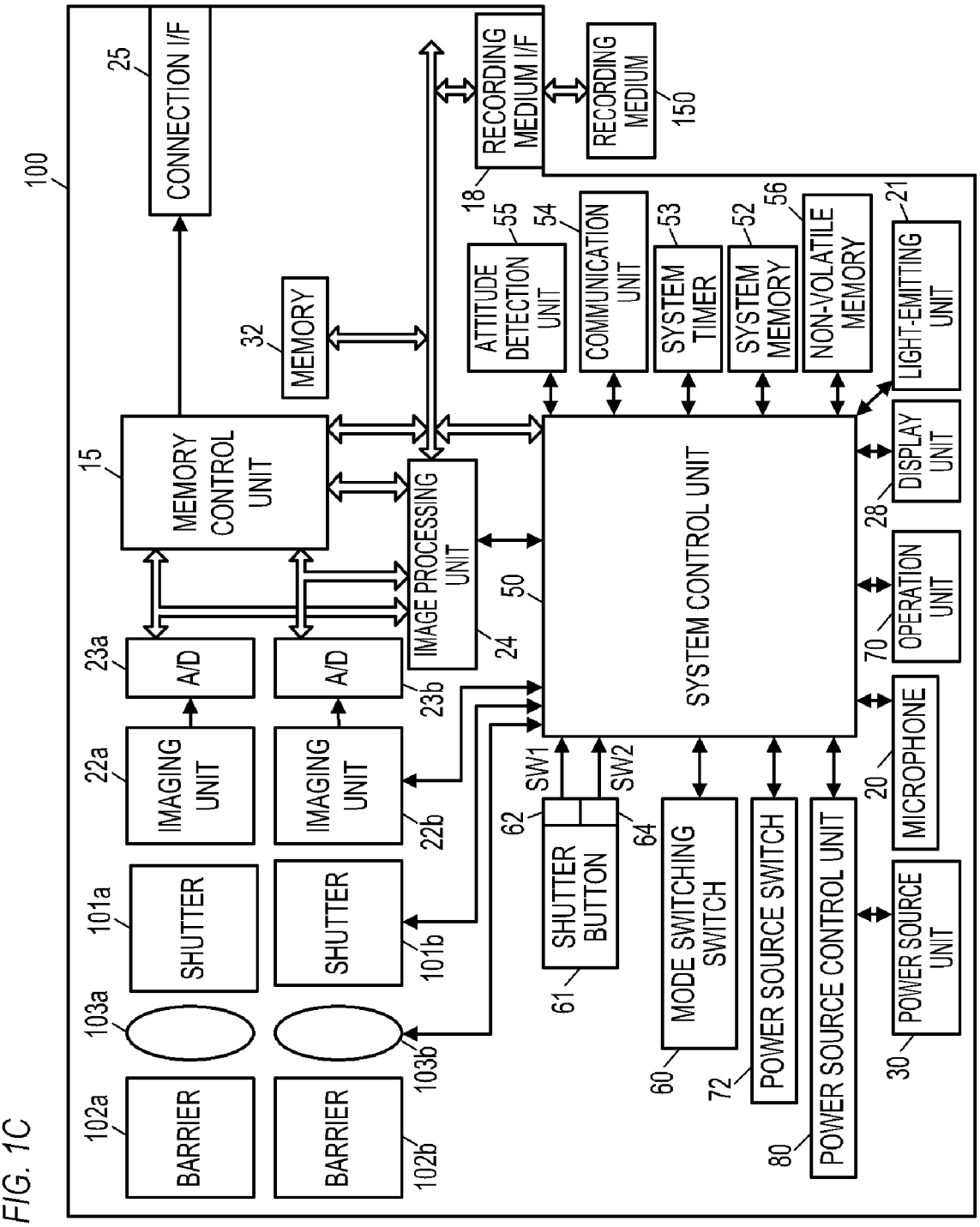

FIG. 1C is a block diagram showing an example of the configuration of the digital camera 100.

The barrier 102a covers imaging systems (an imaging lens 103a, a shutter 101a, and an imaging unit 22a) of the front camera unit to thereby prevent the imaging systems from being soiled or damaged. The imaging lens 103a is a lens group including a zoom lens and a focus lens, and is a wide-angle lens. The shutter 101a is a shutter having diaphragm function of adjusting an amount of object light incident on the imaging unit 22a. The imaging unit 22a is an imaging device constituted by a CCD or a CMOS device that converts an optical image into an electrical signal. An A/D converter 23a converts an analog signal outputted from the imaging unit 22a into a digital signal. Note that, instead of providing the barrier 102a, the outer surface of the imaging lens 103a may be exposed and the other imaging systems (the shutter 101a and the imaging unit 22a) may be prevented from being soiled or damaged by the imaging lens 103a.

The barrier 102b covers imaging systems (an imaging lens 103b, a shutter 101b, and an imaging unit 22b) of the rear camera unit to thereby prevent the imaging systems from being soiled or damaged. The imaging lens 103b is a lens group including a zoom lens and a focus lens, and is a wide-angle lens. The shutter 101b is a shutter having diaphragm function of adjusting an amount of object light incident on the imaging unit 22b. The imaging unit 22b is an imaging device constituted by a CCD or a CMOS device that converts an optical image into an electrical signal. An A/D converter 23b converts an analog signal outputted from the imaging unit 22b into a digital signal. Note that, instead of providing the barrier 102b, the outer surface of the imaging lens 103b may be exposed, and the other imaging systems (the shutter 101b and the imaging unit 22b) may be prevented from being soiled or damaged by the imaging lens 103b.

A virtual reality (VR) image is captured by the imaging unit 22a and the imaging unit 22b. The VR image is assumed to be an image capable of VR display. The VR image is assumed to include an omnidirectional image (celestial sphere image) captured by an omnidirectional camera (celestial sphere camera), and a panorama image having an image area (effective image area) wider than a display area that can be displayed at a time in a display unit. In addition to a still image, the VR image includes a video and a live view image (an image acquired substantially in real time from a camera). The VR image has the maximum image area (effective image area) corresponding to a field of view of 360 degrees in the up-and-down direction (a vertical angle, an angle from the zenith, an elevation angle, a depression angle, an altitude angle) and 360 degrees in the left-and-right direction (a horizontal angle, an azimuth angle).

In addition, the VR image is considered to include an image having an angle of view (field-of-view area) wider than the angle of view of a typical camera, or an image having an image area (effective image area) wider than a display area that can be displayed at a time in a display unit even if the image has an angle of less than 360 degrees in the up-and-down direction or an angle of less than 360 degrees in the left-and-right direction. For example, an image captured by a celestial sphere camera capable of capturing an image of an object corresponding to a field of view (angle of view) of an angle of 360 degrees in the left-and-right direction (the horizontal angle, the azimuth angle) and a vertical angle of 210 degrees having the zenith as the center is a kind of the VR image. In addition, for example, an image captured by a camera capable of capturing an image of an object corresponding to a field of view (angle of view) of an angle of 180 degrees in the left-and-right direction (the horizontal direction, the azimuth direction) and a vertical angle of 180 degrees having the horizontal direction as the center is a kind of the VR image. That is, an image having an image area corresponding to a field of view of not less than 160 degrees (±80 degrees) in each of the up-and-down direction and the left-and-right direction, and having an image area wider than an area that can be visually recognized at a time by man is a kind of the VR image.

When the VR image is displayed according to the VR display (displayed in a display mode: "VR view"), it is possible to view an omnidirectional image that is seamless in the left-and-right direction (horizontal rotation direction) by changing the attitude of a display apparatus (a display apparatus for displaying the VR image) in a left-and-right rotation direction. It is possible to view an omnidirectional image that is seamless in a range of ±105 degrees when viewed from immediately above (the zenith) in the up-and-down direction (vertical rotation direction), but a region in a range exceeding 105 degrees when viewed from immediately above is a blank region in which an image is not present. The VR image can also be described as "an image in which an image area is at least part of virtual space (VR space)".

The VR display (VR view) is a display method (display mode) which is capable of changing the display area, and displays an image in part of a field-of-view area (display area; display region) in the VR image corresponding to the attitude of the display apparatus. In the case where the VR image is viewed with a head-mounted display (HMD) serving as the display apparatus, an image in the field-of-view area corresponding to the orientation of the face of the user is displayed. For example, it is assumed that, in the VR image, an image of a view angle (angle of view) that has an angle of 0 degrees in the left-and-right direction (specific azimuth, e.g., the north) and has an angle of 90 degrees in the up-and-down direction (90 degrees from the zenith, i.e., horizontal) as the center is displayed at some point of time. In this state, when the attitude of the display apparatus is turned inside out (e.g., when the display surface that is directed southward is directed northward), in the same VR image, the display area is changed and an image of a view angle that has an angle of 180 degrees in the left-and-right direction (opposite azimuth, e.g., the south) and has an angle of 90 degrees in the up-and-down direction (horizontal) as the center is displayed. In the case where the user views the HMD, when the user turns his/her face toward the south from the north (i.e., when the user faces rearward), the image displayed in the HMD is changed from an image of the north to an image of the south. With the VR display described above, it is possible to give the user the feeling of being in the VR image (in the VR space) visually. A smart phone mounted to VR goggles (head-mounted adaptor) can be described as a kind of the HMD.

Note that the display method of the VR image is not limited to the method described above. The display area may be moved (scrolled) in response to user operations performed on the touch panel and direction buttons instead of the attitude change. At the time of the VR display (at the time of the VR view mode), both of a process for changing the display area in response to the attitude change and a process for changing the display area in response to a touch-move operation performed on the touch panel or a drag operation performed on an operation member such as a mouse may be performed.

An image processing unit 24 performs predetermined processing (pixel interpolation, resizing processing such as size reduction, and color conversion processing) on data from the A/D converter 23a and the A/D converter 23b, or data from a memory control unit 15. In addition, the image processing unit 24 performs predetermined arithmetic processing by using captured image data. A system control unit 50 performs exposure control and distance measurement control based on the result of arithmetic calculation obtained by the image processing unit 24. With this, autofocus (AF) processing that uses the through-the-lens (TTL) method, auto exposure (AE) processing, and electronic flash pre-emission (EF) processing are performed. Further, the image processing unit 24 performs predetermined arithmetic processing by using the captured image data, and performs auto white balance (AWB) processing that uses the TTL method based on the obtained result of arithmetic calculation. In addition, the image processing unit 24 performs basic image processing on two images (fish-eye images) obtained by the A/D converter 23a and the A/D converter 23b, and generates a single VR image by performing image connection processing for combining the two images having been performed to the basic image processing. Further, the image processing unit 24 performs image cut-out processing, enlargement processing, and distortion correction for performing the VR display of the VR image at the time of the VR display when live view is used or at the time of reproduction, and performs rendering in which the processing result is rendered in a predetermined storage area in a memory 32.

In the image connection processing, the image processing unit 24 uses one of the two images as a reference image and uses the other of the two images as a comparison image, calculates an amount of displacement between the reference image and the comparison image for each area by pattern matching processing, and detects a connection position at which the two images are connected to each other based on the displacement amount of each area. Subsequently, the image processing unit 24 corrects the distortion of each image by geometrical transformation while considering the detected connection position and lens characteristics of each optical system. With this, each image is converted into an image of a celestial sphere type. Then, the image processing unit 24 generates one celestial sphere image (VR image) by combining (blending) two images of the celestial sphere type. The generated celestial sphere image is an image that uses, e.g., equidistant cylindrical projection, and it is possible to associate the position of each pixel of the celestial sphere image with coordinates on the surface of a sphere (VR space).

Output data from the A/D converters 23a and 23b is written into the memory 32 via the image processing unit 24 and the memory control unit 15 or via the memory control unit 15. The memory 32 stores image data that is obtained by the imaging units 22a and 22b and is converted into digital data by the A/D converters 23a and 23b, and image data that is to be outputted to an external display apparatus from the connection I/F 25. The memory 32 has a storage capacity that is sufficient enough to store a predetermined number of still images, a video of a predetermined time period, and sound.

In addition, the memory 32 also serves as a memory for image display (video memory). Data for image display stored in the memory 32 can be outputted to the external display apparatus from the connection I/F 25. By sequentially transferring the VR images captured by the imaging units 22a and 22b, generated by the image processing unit 24, and accumulated in the memory 32 to the external display apparatus and displaying the VR images, it is possible to implement function as an electronic view finder, and implement live view display (LV display). Hereinafter, an image displayed according to the live view display is referred to as a live view image (LV image). Similarly, it is possible to implement the live view display (remote LV display) by sequentially transferring the VR images accumulated in the memory 32 to an external apparatus (a smart phone or the like) that is wirelessly connected via a communication unit 54 and displaying the VR images.

A non-volatile memory 56 is a memory serving as an electrically erasable/recordable recording medium, and is, e.g., an EEPROM or the like. In the non-volatile memory 56, constants and programs for the operation of the system control unit 50 are recorded. The programs mentioned herein denote computer programs for executing various flowcharts described later in the present embodiment.

The system control unit 50 is a control unit that has at least one processor or one circuit, and controls the entire digital camera 100. The system control unit 50 implements each processing of the present embodiment described later by executing the programs recorded in the non-volatile memory 56 described above. A system memory 52 is, e.g., a RAM, and the system control unit 50 loads constants and variables for the operation of the system control unit 50, and the programs read from the non-volatile memory 56 into the system memory 52. In addition, the system control unit 50 performs display control by controlling the memory 32, the image processing unit 24, and the memory control unit 15. A system timer 53 is a time measurement unit that measures time used for various control operations and time of an integrated clock.

The mode switching switch 60, the shutter button 61, the operation units 70, and the power source switch 72 are used for inputting various operation instructions to the system control unit 50.

The mode switching switch 60 switches the operation mode of the system control unit 50 to any of a still image recording mode, a video shooting mode, a reproduction mode, and a communication connection mode. The still image recording mode includes an automatic shooting mode, an automatic scene determination mode, a manual mode, a diaphragm priority mode (Av mode), a shutter speed priority mode (Tv mode), and a program AE mode (P mode).

In addition, the still image recording mode includes various scene modes and custom modes serving as shooting settings of each shooting scene. The user can directly switch the operation mode to any of these modes using the mode switching switch 60. Alternatively, after switching a screen to a list screen of shooting modes by using the mode switching switch 60, the operation mode may be selectively switched to any of a plurality of modes displayed in the display unit 28 by using other operation members. Similarly, the video shooting mode may include a plurality of modes.

The shutter button 61 includes a first shutter switch 62 and a second shutter switch 64. The first shutter switch 62 is turned ON by what is called a half-press operation (shooting preparation instruction) in the process of the operation of the shutter button 61, and generates a first shutter switch signal SW1. With the first shutter switch signal SW1, the system control unit 50 starts a shooting preparation operation such as the autofocus (AF) processing, the auto exposure (AE) processing, the auto white balance (AWB) processing, or the electronic flash pre-emission (EF) processing. The second shutter switch 64 is turned ON by what is called a full-press operation (shooting instruction) when the operation of the shutter button 61 is completed, and generates a second shutter switch signal SW2. With the second shutter switch signal SW2, the system control unit 50 starts a series of operations of shooting processing from reading of the signals from the imaging units 22a and 22b to writing of the image data into a recording medium 150.

Note that the shutter button 61 is not limited to the operation member capable of operations in two stages that are the full-press operation and the half-press operation, and may also be an operation member capable of a press operation in one stage. In this case, the shooting preparation operation and the shooting processing are successively performed with the press operation in one stage. This is an operation identical to that in the case where the shutter button capable of the half-press operation and the full-press operation is pressed all the way down (in the case where the first shutter switch signal SW1 and the second shutter switch signal SW2 are generated almost simultaneously).

A function is assigned to the operation unit 70 appropriately for each scene by choosing and operating various function icons and choices displayed in the display unit 28, and the operation units 70 function as various function buttons. Examples of the function button include an end button, a return button, an image feed button, a jump button, a stop-down button, an attribute change button, and an INFO button. For example, when a menu button is pressed down, a menu screen on which various setting can be performed is displayed in the display unit 28. The user can perform various settings intuitively by operating the operation units 70 while looking at the menu screen displayed in the display unit 28.

The power source switch 72 is the push button for switching the power source between ON and OFF states. A power source control unit 80 is constituted by a battery detection circuit, a DC-DC converter, and a switch circuit for switching a block to be energized, and detects the presence or absence of a mounted battery, the type of the battery, and a remaining battery level. In addition, the power source control unit 80 controls the DC-DC converter based on the detection result and the instruction of the system control unit 50, and supplies required voltages to the individual units including the recording medium 150 for required time periods. A power source unit 30 is constituted by a primary battery such as an alkaline battery or a lithium battery, a secondary battery such as a NiCd battery, a NiMH battery, or a Li battery, and an AC adaptor.

A recording medium I/F 18 is an interface with the recording medium 150 such as a memory card or a hard disk. The recording medium 150 is a recording medium for recording a captured image such as a memory card or the like, and is constituted by a semiconductor memory, an optical disk, or a magnetic disk. The recording medium 150 may be an exchangeable recording medium that can be attached to and detached from the digital camera 100, and may also be a recording medium integrated in the digital camera 100.

The communication unit 54 performs transmission and reception of an image signal and a sound signal between the communication unit 54 and an external apparatus that is connected to the communication unit 54 wirelessly or using a cable. The communication unit 54 can be connected to a wireless local area network (LAN) and the Internet, and can communicate with an external apparatus (a server or the like) on the network via the network. In addition, the communication unit 54 can communicate with the external apparatus using Bluetooth (registered trademark) or Bluetooth Low Energy. The communication unit 54 can transmit the image (including the LV image) captured by the imaging units 22a and 22b and the image recorded in the recording medium 150, and can receive the image and other various information from the external apparatus.

An attitude detection unit 55 detects the attitude of the digital camera 100 with respect to the direction of gravity. It is possible to determine whether the image captured by the imaging units 22a and 22b is an image captured by the digital camera 100 that is held widthwise or an image captured by the digital camera 100 that is held lengthwise based on the attitude detected by the attitude detection unit 55. In addition, it is possible to determine whether or not the image captured by the imaging units 22a and 22b is captured by the digital camera 100 that is tilted in a rotation direction such as a yaw direction, a pitch direction, or a roll direction, and it is also possible to determine an amount of the tilt. The system control unit 50 can add orientation information corresponding to the attitude detected by the attitude detection unit 55 to an image file of the VR image captured by the imaging units 22a and 22b, and rotate (adjust the orientation of) the image such that tilt correction is performed) and record the image. As the attitude sensor 55, it is possible to use a combination of one or more of a plurality of sensors such as acceleration sensors, gyro sensors, geomagnetic sensors, azimuth sensors, and altitude sensors. It is also possible to detect the movement of the digital camera 100 (the digital camera 100 is panned, tilted, lifted, or still or not) by using the acceleration sensor, the gyro sensor, and the azimuth sensor that constitute the attitude detection unit 55.

A microphone 20 picks up sound around the digital camera 100 that is recorded as the sound of the VR image (VR video) that is a video. The connection I/F 25 is a connection plug to which an HDMI (registered trademark) cable or a USB cable is connected in order to connect to the external apparatus and perform transmission and reception of an image.

Figure 2A:
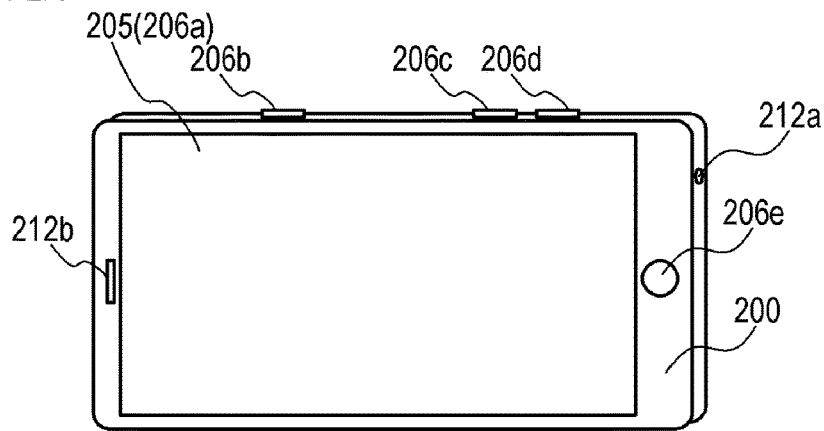
FIG. 2A is an external view of a display apparatus according to the present embodiment.

FIG. 2A is an external view of a display apparatus 200 that is an example of the display control apparatus according to the present embodiment. The display apparatus 200 can be constituted by using a smart phone and the like. A display unit 205 displays images and various information. The display unit 205 is constituted integrally with a touch panel 206a, and can detect touch operations performed on the display surface of the display unit 205. The display apparatus 200 can perform the VR display of the VR image (VR contents) generated by the digital camera 100 or the like in the display unit 205. An operation unit 206b is a power source button that receives an operation for switching a power source of the display apparatus 200 between ON and OFF states. An operation unit 206c and an operation unit 206d are volume buttons for turning up and down the volume of sound outputted from a sound output unit 212. An operation unit 206e is a home button for causing the display unit 205 to display a home screen. A sound output terminal 212a is an earphone jack, and is a terminal for outputting a sound signal to an earphone or an external speaker. A speaker 212b is an integrated speaker for outputting sound.

Figure 2B:
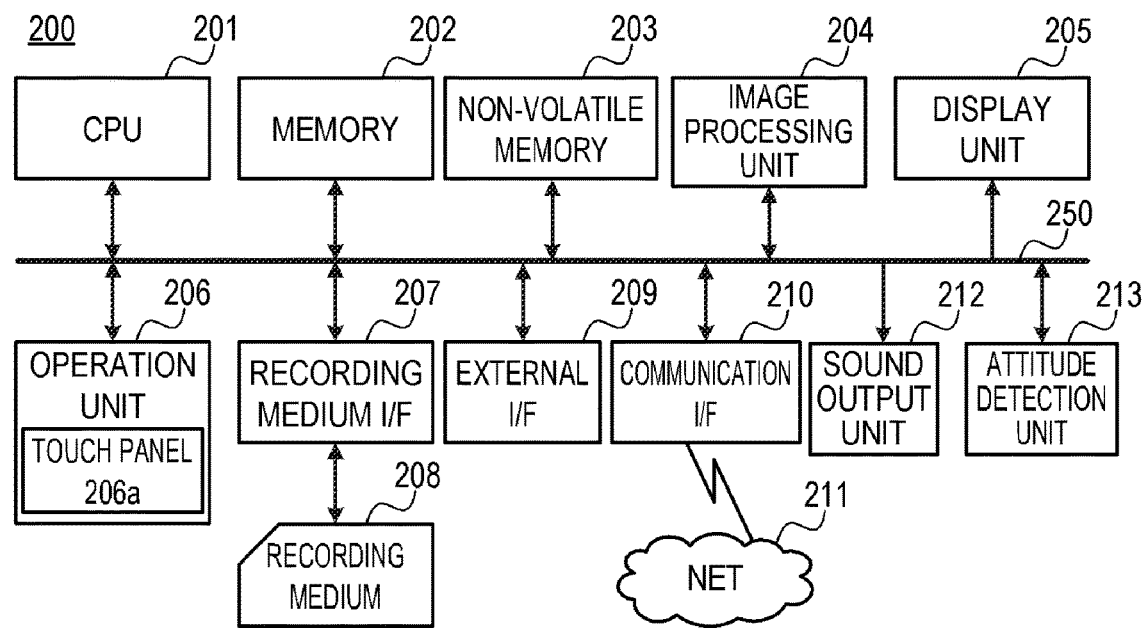
FIG. 2B is a block diagram of the display apparatus according to the present embodiment.

FIG. 2B is a block diagram showing an example of the configuration of the display apparatus 200. To an internal bus 250, a CPU 201, a memory 202, a non-volatile memory 203, an image processing unit 204, a display unit 205, an operation unit 206, a recording medium I/F 207, an external I/F 209, and a communication I/F 210 are connected. In addition, to the internal bus 250, the sound output unit 212 and an attitude detection unit 213 are connected. The individual units connected to the internal bus 250 are configured to be able to exchange data with each other via the internal bus 250.

The CPU 201 is a control unit that controls the entire display apparatus 200, and is constituted by at least one processor or one circuit. The memory 202 is constituted by, e.g., a RAM (a volatile memory that uses a semiconductor device). The CPU 201 controls the individual units of the display apparatus 200 by using the memory 202 as a work memory according to a program stored in, e.g., the non-volatile memory 203. The non-volatile memory 203 stores image data, sound data, other data, and various program for operation of the CPU 201. The non-volatile memory 203 is constituted by, e.g., a flash memory or a ROM.

The image processing unit 204 performs various image processing on the image stored in the non-volatile memory 203 or a recording medium 208, the image signal acquired via the external I/F 209, and the image acquired via the communication I/F 210 based on the control of the CPU 201. The image processing performed by the image processing unit 204 includes A/D conversion processing, D/A conversion processing, coding processing of image data, compression processing, decoding processing, enlargement/reduction processing (resizing), noise reduction processing, and color conversion processing. In addition, the image processing unit 204 performs various image processing such as panoramic expansion, mapping processing, and conversion of the VR image that is an omnidirectional image or a wide-area image having wide-area data, though not the omnidirectional image. The image processing unit 204 may also be constituted by a dedicated circuit block for performing specific image processing. In addition, depending on the type of image processing, the CPU 201 can perform the image processing according to a program without using the image processing unit 204.

The display unit 205 displays images and a GUI screen constituting a graphical user interface (GUI) based on the control of the CPU 201. The CPU 201 controls the individual units of the display apparatus 200 such that a display control signal is generated according to a program, and an image signal to be displayed in the display unit 205 is generated and outputted to the display unit 205. The display unit 205 displays the image based on the generated image signal. Note that the configuration of the display control apparatus according to the present embodiment may include up to the interface for outputting the image signal to be displayed in the display unit 205, and the display unit 205 may be constituted by an external monitor (a television apparatus or an HMD).

The operation unit 206 is an input device for receiving user operations that includes a character information input device such as a keyboard, a pointing device such as a mouse or a touch panel, a button, a dial, a joystick, a touch sensor, and a touch pad. In the present embodiment, the operation unit 206 includes the touch panel 206a, and the operation units 206b, 206c, 206d, and 206e.

The recording medium 208 such as a memory card, a CD, or a DVD can be attached to or detached from the recording medium I/F 207. The recording medium I/F 207 reads data from the recording medium 208 attached to the recording medium I/F 207, and writes data into the recording medium 208 based on the control of the CPU 201. For example, as the recording medium 208, it is possible to attach the recording medium 150 in which the celestial sphere image generated by the digital camera 100 is recorded. In this case, the image signal of the VR image can be read from the recording medium 208 and displayed in the display unit 205. The external I/F 209 is an interface that is connected to an external apparatus with a cable or wirelessly and is used for performing input and output of an image signal and a sound signal. The communication I/F 210 is an interface that communicates with the external apparatus and the Internet 211 and is used for performing transmission and reception of various data such as a file and a command.

The sound output unit 212 outputs sound of a video and music data, an operation tone, a ring tone, and various notification sounds. The sound output unit 212 is assumed to include the sound output terminal 212a to which an earphone or the like is connected and the speaker 212b, but the sound output unit 212 may also perform the sound output using wireless communication or the like.

The attitude detection unit 213 detects the attitude of the display apparatus 200 with respect to the direction of gravity. It is possible to determine whether the display apparatus 200 is held widthwise or lengthwise, whether the display apparatus 200 is directed upward or downward, and whether or not the display apparatus 200 is held obliquely based on the attitude detected by the attitude detection unit 213. In addition, it is also possible to determine the presence or absence of the tilt of the display apparatus 200 in the rotation direction such as the yaw direction, the pitch direction, or the roll direction and an amount of the tilt, and determine whether or not the display apparatus 200 has rotated in the rotation direction. As the attitude detection unit 213, it is possible to use a combination of one or more of a plurality of sensors such as the acceleration sensors, the gyro sensors, the geomagnetic sensors, the azimuth sensors, and the altitude sensors. Note that, in the case where the display control apparatus according to the present embodiment is separate from the display apparatus (in the case where the display unit 205 is an external monitor), the attitude detection unit 213 may be provided not in the display control apparatus but in the display apparatus.

As described above, the operation unit 206 includes the touch panel 206a. The touch panel 206a is an input device that is flatly formed to be stacked on the display unit 205, and outputs coordinate information corresponding to a contact position. The CPU 201 can detect the following operations performed on the touch panel 206a or states.

that a finger or a pen that does not touch the touch panel 206a newly touches the touch panel 206a, i.e., a start of touch (hereinafter referred to as "Touch-Down")

a state in which the finger or the pen touches the touch panel 206a (hereinafter referred to as "Touch-On")

that the finger or the pen that touches the touch panel 206a moves (hereinafter referred to as "Touch-Move")

that the finger or the pen that touches the touch panel 206a moves away from the touch panel 206a, i.e., an end of touch (hereinafter referred to as Touch-Up)

a state in which nothing touches the touch panel 206a (hereinafter referred to as Touch-Off)

When Touch-Down is detected, Touch-On is detected simultaneously. After the detection of Touch-Down, as long as Touch-Up is not detected, Touch-On is continuously detected usually. Also in the case where Touch-Move is detected, Touch-On is detected simultaneously. Even when Touch-On is detected, in the case where the touch position is not moved, Touch-Move is not detected. When Touch-Up of all fingers or the pen that touches the touch panel is detected, Touch-Off is detected.

The CPU 201 is notified of these operations and states, and position coordinates of the position of touch of the finger or the pen on the touch panel 206a via the internal bus, and determines which operation (touch operation) has been performed on the touch panel 206a based on the information of which the CPU 201 has been notified. With regard to Touch-Move, it is possible to determine the movement direction of the finger or the pen that moves on the touch panel 206a for each vertical component and each horizontal component on the touch panel 206a based on change of the position coordinates. In the case where Touch-Move of a predetermined distance or more is detected, it is determined that a sliding operation has been performed.

An operation in which the finger that touches the touch panel 206a is quickly moved by a certain distance and is then moved away from the touch panel 206a is called a flick. The flick is, i.e., an operation of sliding the finger on the touch panel 206a quickly such that the finger flicks the touch panel 206a. When Touch-Move having a predetermined distance or more and having a predetermined speed or higher is detected and Touch-Up is also detected, it is possible to determine that the flick has been performed (it is possible to determine that the flick has been performed subsequently to the sliding operation).

Further, a touch operation in which a plurality of places (e.g., two points) are touched simultaneously and the touch positions are brought close to each other is referred to as pinch-in, and a touch operation in which the touch positions are moved away from each other is referred to as pinch-out. The pinch-in and the pinch-out are collectively referred to as a pinch operation (or simply pinch). The touch panel 206a used herein may have any of various touch panel systems such as a resistive membrane system, an electrostatic capacitance system, a surface acoustic wave system, an infrared system, an electromagnetic induction system, an image recognition system, and an optical sensor system. There are a system that detects touch based on contact with the touch panel and a system that detects touch based on approach of the finer or the pen to the touch panel, and either system may be used.

Figure 2C:
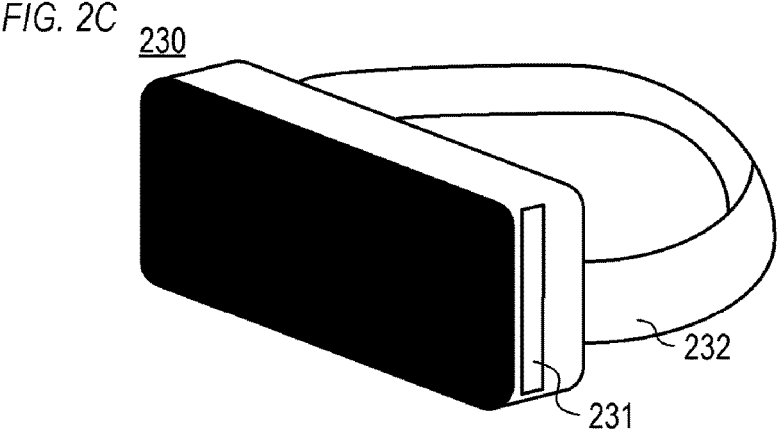
FIG. 2C is an external view of VR goggles according to the present embodiment.

FIG. 2C is an external view of VR goggles (head-mounted adaptor) 230 to which the display apparatus 200 can be mounted. The display apparatus 200 is mounted to the VR goggles 230, and the display apparatus 200 can be thereby used as the head-mounted display. An insertion opening 231 is an insertion opening into which the display apparatus 200 is inserted. The entire display apparatus 200 can be inserted into the VR goggles 230 with the display surface of the display unit 205 facing the side of a head band 232 (i.e., a user side) for fixing the VR goggles 230 to the head of the user. The user can see the display unit 205 without manually holding the display apparatus 200 in a state in which the VR goggles 230 to which the display apparatus 200 is mounted is mounted on the head of the user. In this case, when the user moves the head or the entire body, the attitude of the display apparatus 200 changes. The attitude detection unit 213 detects the attitude change of the display apparatus 200 at this point, and the CPU 201 performs processing for the VR display based on the attitude change. In this case, the detection of the attitude of the display apparatus 200 by the attitude detection unit 213 is equivalent to the detection of the attitude of the head of the user (a direction that eyes of the user face).

Figure 3:
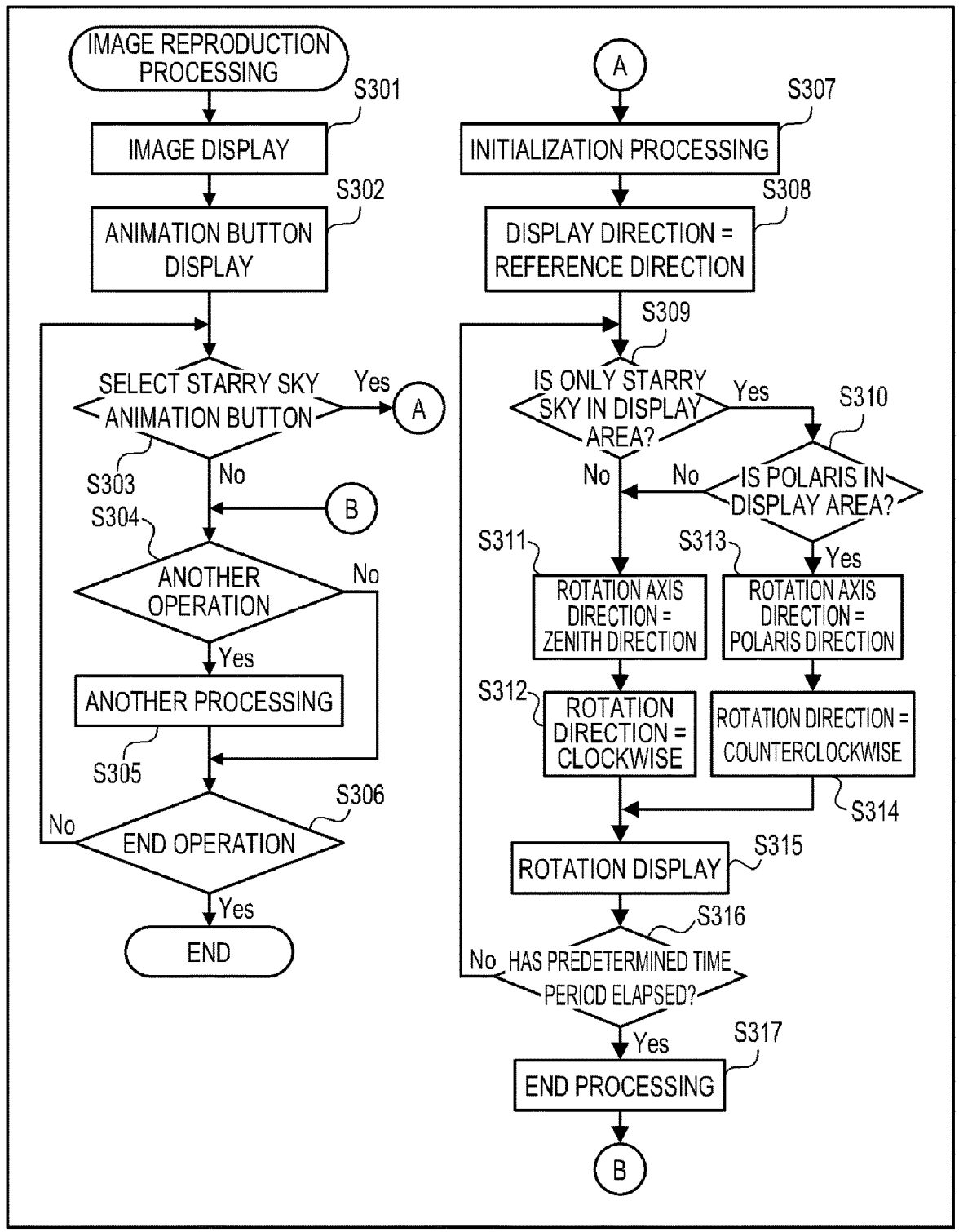
FIG. 3 is a flowchart showing processes of the display apparatus according to the present embodiment.

FIG. 3 is a flowchart associated with image reproduction processing of the display apparatus 200. A program (e.g., a specific application program for performing the VR display of the VR image recorded in the recording medium 208) recorded in the non-volatile memory 203 is loaded into the memory 202 and the CPU 201 executes the program, and the image reproduction processing is thereby implemented. When the power source button 206b is operated and the power source of the display apparatus 200 is turned ON, the CPU 201 starts the image reproduction processing after initializing a flag and a control variable.

In Step S301, the CPU 201 acquires the VR image stored in the recording medium 208, and displays a reference area (a predetermined display area) of the VR image in the display unit 205. In the present embodiment, information on a reference direction that is a predetermined display direction is included in metadata of the VR image. The display direction is a direction for the VR display, and is a direction from the center of the VR space formed by the VR image toward the center of the display area. The CPU 201 displays, as the reference area, an area that has a position indicated (shown) by the reference direction as the center and has a size corresponding to the size of the display unit 205 based on the reference direction and the VR image in the display unit 205. The reference direction is, e.g., a direction corresponding to the attitude of the digital camera 100 at the time of shooting. Specifically, the reference direction is a direction indicative of a position at which an azimuth angle matches the optical axis of either one of the front camera unit and the rear camera unit (e.g., the front camera unit), and an elevation angle is an angle in a horizontal direction. The reference direction may also be a direction that the front of the digital camera 100 faces at the time of shooting.

Figure 4B:
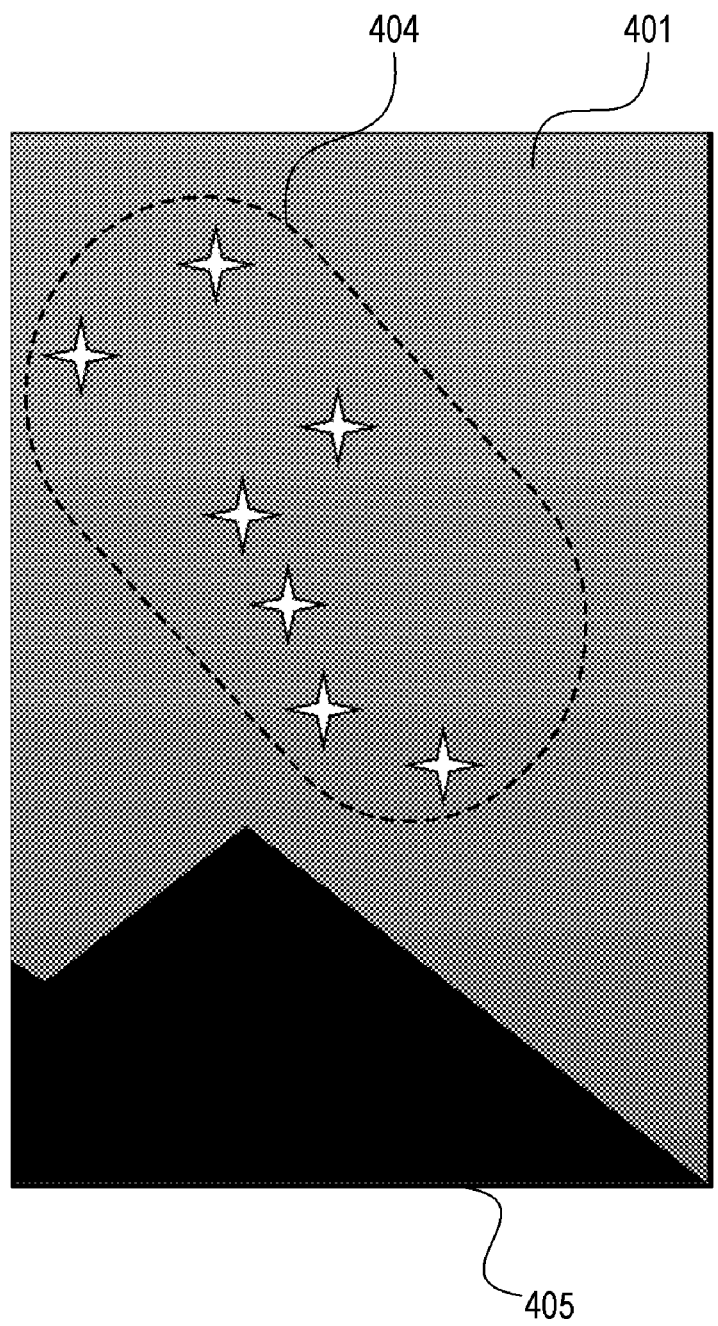
FIG. 4A is a view showing an example of a VR image according to the present embodiment, and each of FIGS. 4B to 4G is a view showing an example of a display screen according to the present embodiment.

FIG. 4A shows a starry sky image 401 that is an example of the VR image including a celestial body (starry sky). The starry sky image 401 includes Polaris 402, stars 403 around Polaris, the Big Dipper 404, and a mountain 405. FIG. 4B shows an example of a screen displayed in Step S301. The screen in FIG. 4B displays a partial area of the starry sky image 401 such that the Big Dipper 404 is displayed. In the case where a display target is the starry sky image 401 and the reference direction indicates the position of the Big Dipper 404, the screen in FIG. 4B is displayed in Step S301.

Figure 4C:
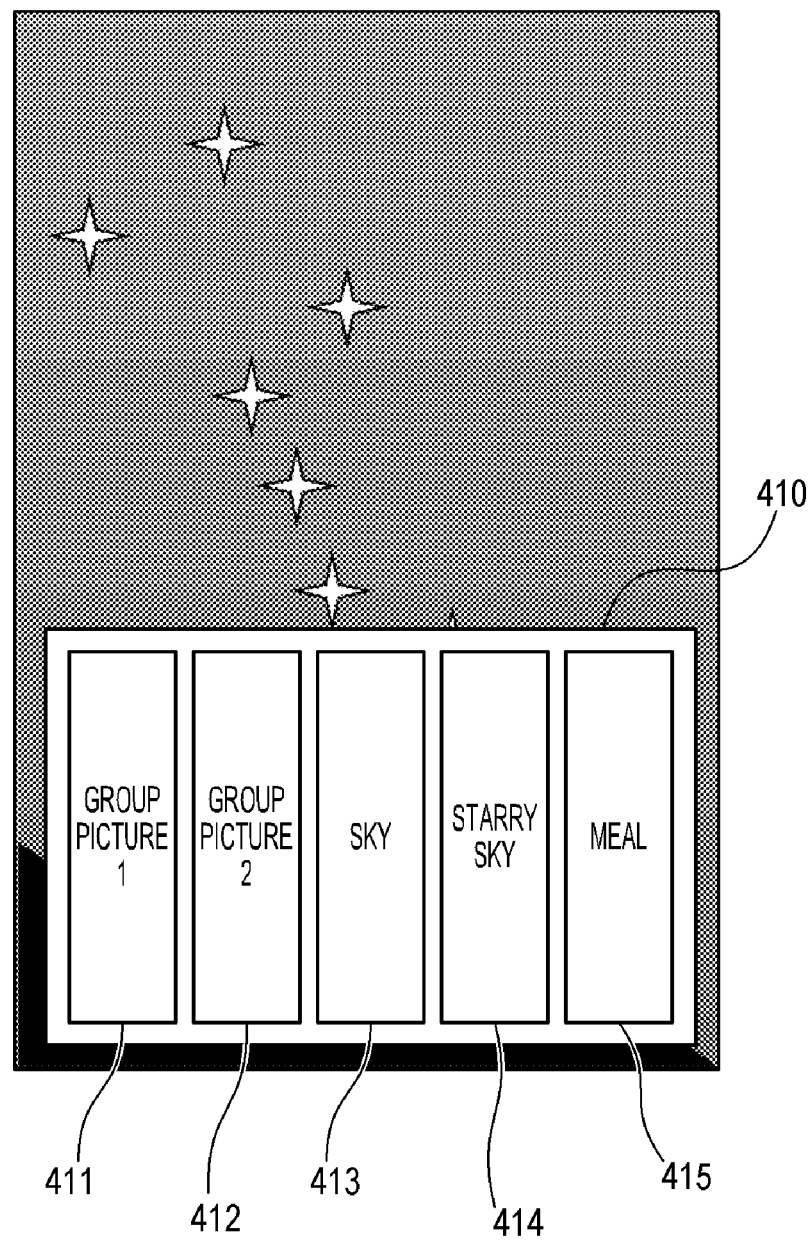
Figure 4D:
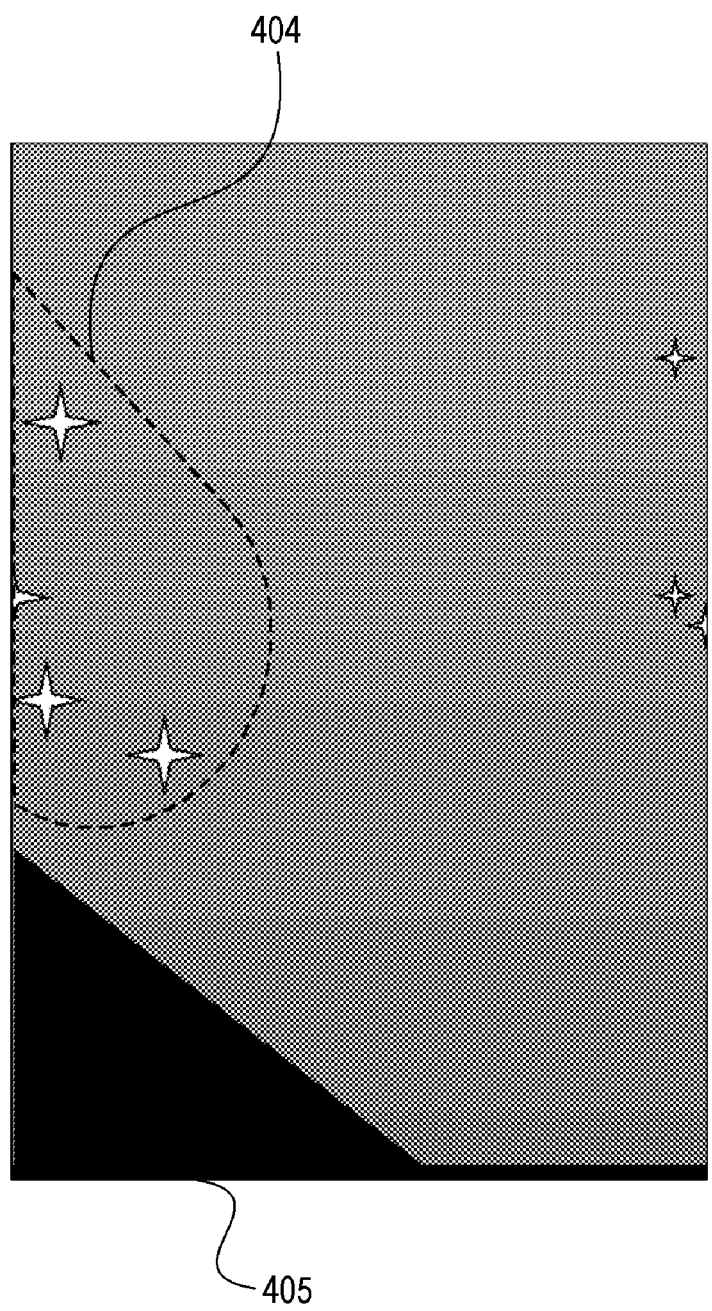

In Step S302, the CPU 201 displays animation buttons (buttons for displaying the VR image while moving the VR image) that are superimposed on the screen displayed in Step S301. FIG. 4C shows an example of a screen displayed in Step S302. In the screen in FIG. 4C, a menu 410 including animation buttons 411 to 415 is displayed so as to be superimposed on the screen in FIG. 4B. The animation buttons 411 to 415 have different movements of the VR image. The animation button 414 is a starry sky animation button for displaying the VR image with display processing aiming at the starry sky image (processing for displaying the VR image with a movement suitable for the starry sky image; processing for displaying the VR image with a movement that makes the starry sky image look more impressive).

In Step S303, the CPU 201 determines whether or not a selection operation for selecting the starry sky animation button 414 has been performed on the operation unit 206. The flow proceeds to Step S307 in the case where the selection operation for selecting the starry sky animation button 414 has been performed, and the flow proceeds to Step S304 in the case where the selection operation therefor has not been performed.

In Step S304, the CPU 201 determines whether or not another operation has been performed on the operation unit 206. The flow proceeds to Step S305 in the case where another operation has been performed, and the flow proceeds to Step S306 in the case where another operation has not been performed. In Step S305, the CPU 201 performs processing (another processing) corresponding to the performed operation. Subsequently, the flow proceeds to Step S306. For example, the displayed image is enlarged or reduced in response to the pinch operation performed on the touch panel 206a, and the display area is changed in response to the sliding operation performed on the touch panel 206a and the attitude change of the display apparatus 200. In addition, animation display that displays the VR image while moving the VR image is performed in response to the selection operation for selecting any of the animation buttons 411 to 413 and 415. In Step S306, the CPU 201 determines whether or not an end operation (an operation for ending the image reproduction processing) has been performed on the operation unit 206. The image reproduction processing is ended in the case where the end operation has been performed, and the flow proceeds to Step S303 in the case where the end operation has not been performed.

Processes in Steps S307 to S317 will be described. In the case where the starry sky image is displayed while the starry sky image is moved, when rotation display is performed by using a movement that reproduces the actual movement of stars, the user (observer) will be impressed more deeply. For example, in the case where Polaris is included in the starry sky image, the starry sky image looks impressive when a direction in which Polaris (characteristic star) is present is automatically displayed, and the starry sky image looks more impressive when rotation display in which the starry sky image rotates counterclockwise (a direction corresponding to the rotation of the earth) about Polaris is performed. According to the processes in Steps S307 to S317, it is possible to implement the impressive rotation display described above.

In Step S307, the CPU 201 performs initialization processing such as disabling the display of the menu 410, and acquisition of a pattern image (pattern data) used in starry sky determination (described later). In Step S308, the CPU 201 change the display area to the reference area by setting the reference direction as the display direction. The process in Step S308 is performed because there is a possibility that the display area is changed from the reference area in Step S305. By performing the process in Step S308, the user can always view the same rotation display (the rotation display from the reference area). Note that the process in Step S308 may be omitted, and the rotation display from the current display area (field of view) may be performed.

In Step S309, the CPU 201 determines whether or not only the starry sky (celestial body) is included in the field of view. The flow proceeds to Step S310 in the case where only the starry sky is included, and the flow proceeds to Step S311 in the case where an object other than the starry sky is included. In the present embodiment, the celestial body is detected from the displayed VR image (at least the current display area) by pattern matching that uses the above-described pattern image (celestial body detection), and it is determined whether or not only the starry sky is included in the field of view based on the result of the celestial body detection. Note that the determination may also be performed based on shooting parameters such as the shooting mode, shooting time, shooting azimuth (latitude and longitude), and exposure setting of the VR image.

In Step S310, the CPU 201 determines whether or not Polaris is included in the field of view. The flow proceeds to Step S313 in the case where Polaris is included, and the flow proceeds to Step S311 in the case where Polaris is not included. It is determined whether or not Polaris is included based on, e.g., the result of the celestial body detection.

When Polaris is not included (No in S310), the CPU 201 sets a zenith direction of the VR space as the direction of a rotation axis for the rotation display of the VR image in Step S311. In Step S312, the CPU 201 sets a clockwise rotation direction as the rotation direction for the rotation display of the VR image.

When Polaris is included (Yes in S310), the CPU 201 detects a Polaris direction (a direction that passes through the center and Polaris in the VR space), and sets the Polaris direction as the direction of the rotation axis for the rotation display of the VR image in Step S313. The Polaris direction is detected based on, e.g., the result of the celestial body detection. The detection of Polaris direction can also be described as "detection of the rotation axis (axis detection) about which the celestial body included in the VR image rotates in response to the rotation of the earth". In Step S314, the CPU 201 sets a counterclockwise rotation direction as the rotation direction for the rotation display of the VR image.

Note that the rotation directions set in Steps S312 and S314 are not limited to the above rotation directions. However, when the counterclockwise rotation direction is set in Step S314, it is possible to reproduce the movement identical to the actual movement of stars. In addition, when the rotation direction set in Step S312 is made different from the rotation direction set in Step S314, the amount of the change of the rotation is increased as compared with the case where only the rotation axis is changed, and hence it becomes easier for the user to recognize that the actual movement of stars is reproduced in the image that includes the starry sky as an object, and the user will be impressed more deeply.

In Step S315, the CPU 201 displays the VR image while rotating the VR image in the set rotation direction by changing the display area of the VR image while changing the angle of the display area of the VR image with respect to the position corresponding to the set rotation axis (rotation display). Note that rotation speed may be constant, or may also be decreased or increased over time.

In Step S316, the CPU 201 determines whether or not a predetermined time period has elapsed since the start of the rotation display in Step S315. The flow proceeds to Step S317 in the case where the predetermined time period has elapsed, and the flow proceeds to Step S309 in the case where the predetermined time period has not elapsed. In Step S317, the CPU 201 performs end processing (processing for ending the rotation display) such as displaying the menu 410 again.

A description will be given of the change of the display screen (the screen displayed in the display unit 205) in the case where the display target is the starry sky image 401 (FIG. 4A) by using FIGS. 4B to 4G When the starry sky animation button 414 is selected in a state in which the screen in FIG. 4C is displayed, the display of the menu 410 is disabled by the process in Step S307, and the display screen is changed to the screen in FIG. 4B (the screen in the reference direction) by the process in Step S308.

The object other than the celestial body (the mountain 405) is included in the field of view in the screen in FIG. 4B, an axis in the zenith direction is set as the rotation axis (Step S311), and the clockwise rotation direction is set (Step S312). Subsequently, according to the rotation display that uses the set rotation axis and the set rotation direction, the display screen is changed to the screen in FIG. 4D. The object other than the celestial body (the mountain 405) is also included in the field of view in the screen in FIG. 4D, and hence the rotation axis and the rotation direction do not change, and the display screen is changed to the screen in FIG. 4E. In the screen changes among FIGS. 4B, 4D, and 4E, the Big Dipper 404 and the mountain 405 move to the left in the screen. Note that, in the case where only the celestial body is included in the field of view (Yes in S309) but Polaris is not included (No in S310), the similar rotation display is performed.

Figure 4E:
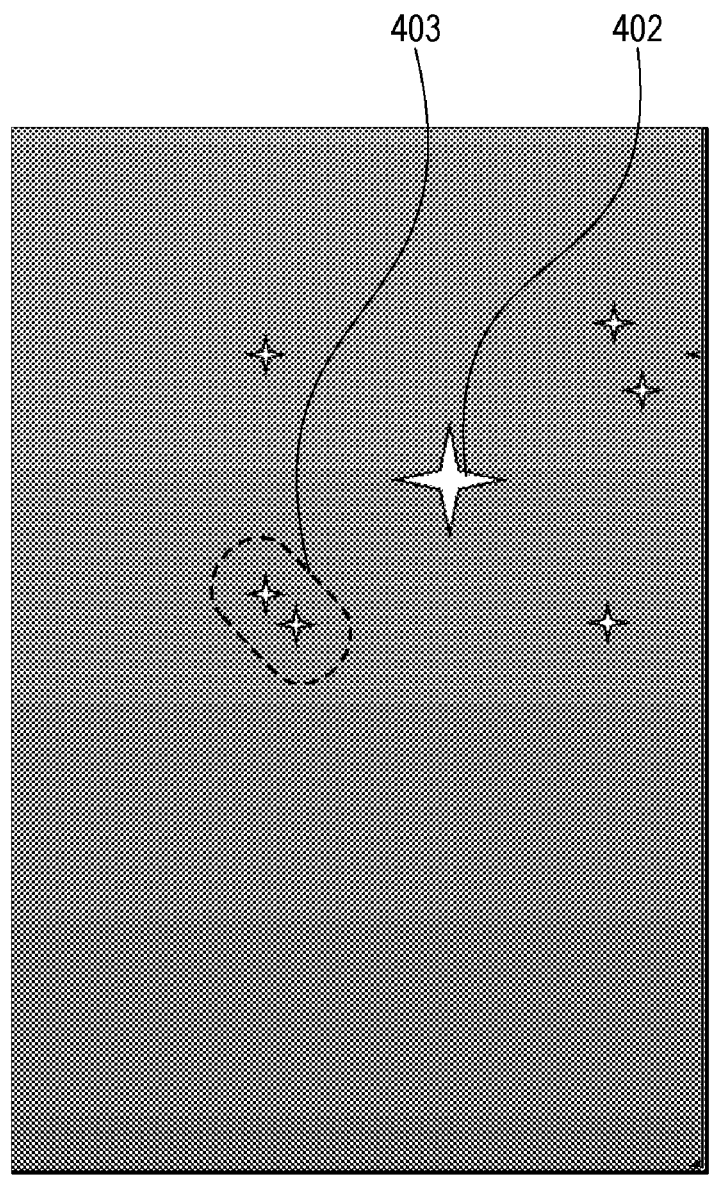
Figure 4F:
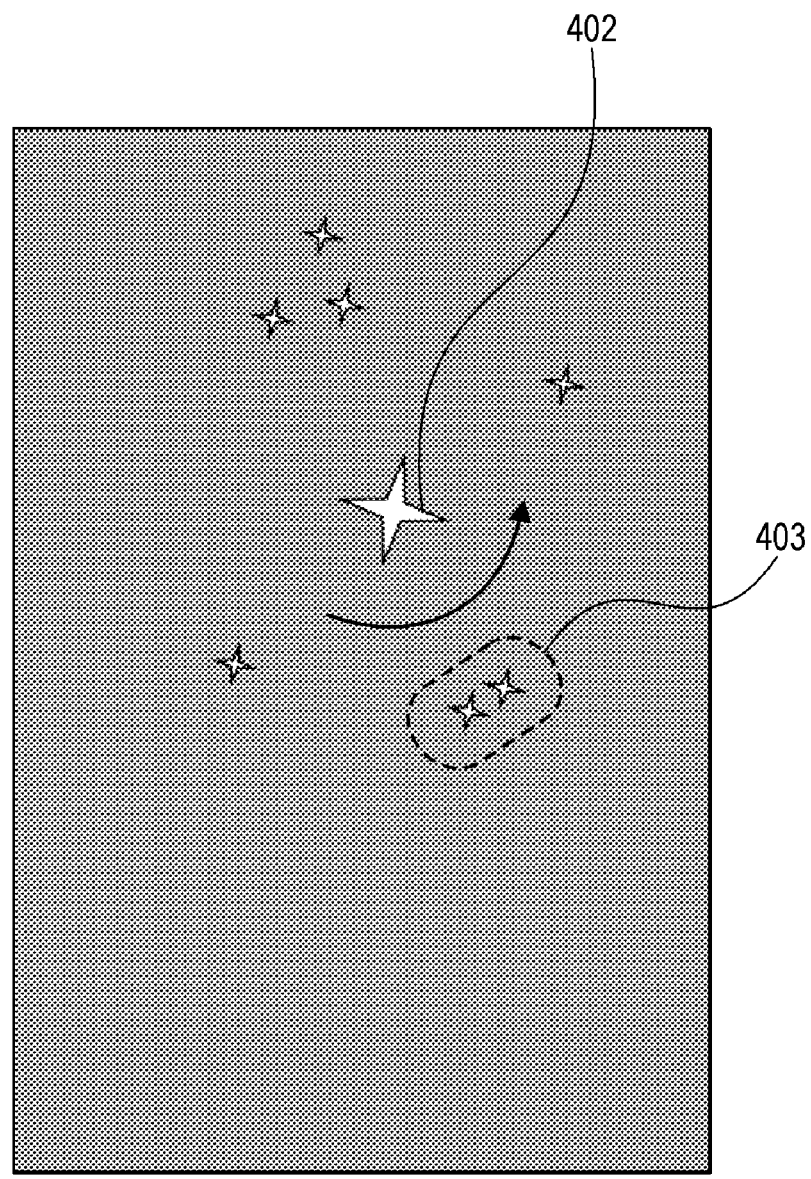
Figure 4G:
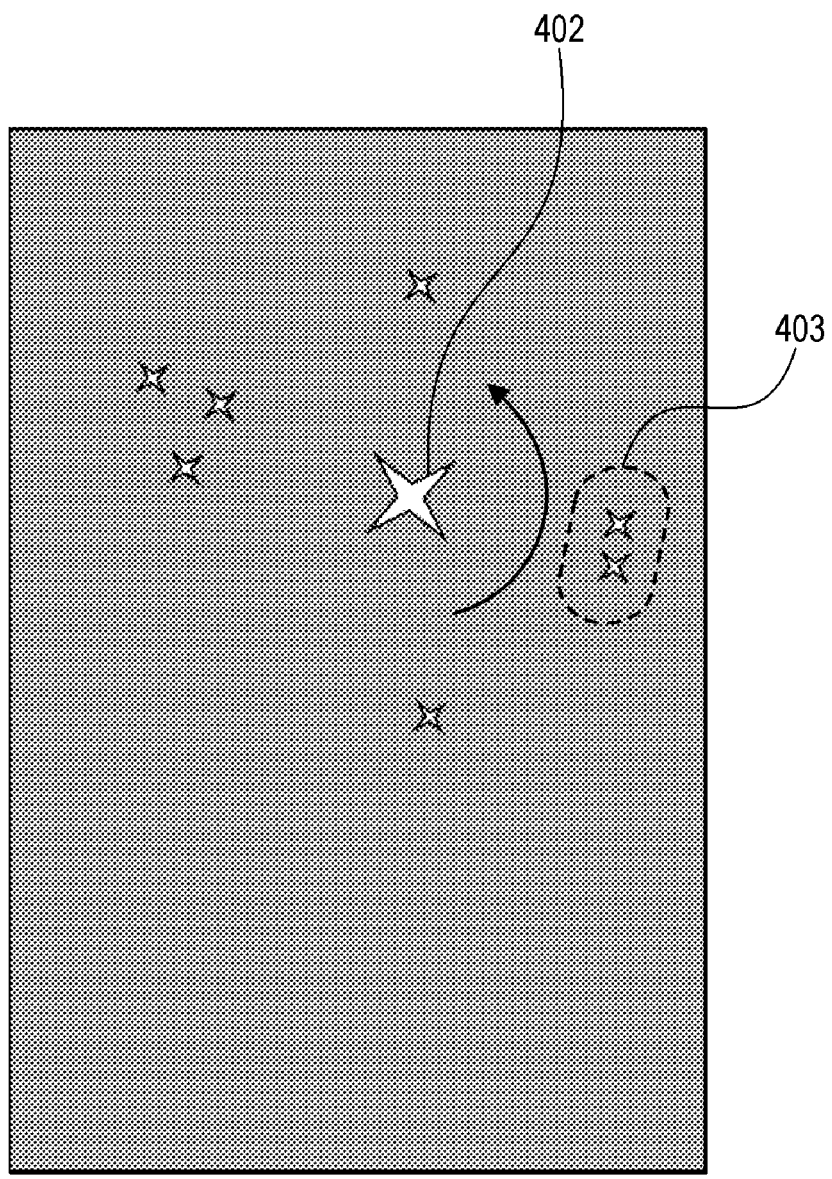

In the screen in FIG. 4E, the mountain 405 completely disappears from the field of view, and only Polaris 402 and the stars 403 around Polaris are included in the field of view. Consequently, the rotation axis is switched from the axis in the zenith direction to the axis in the Polaris direction (Step S313), and the rotation direction is switched from the clockwise rotation direction to the counterclockwise rotation direction (Step S314). Subsequently, the display screen is changed to the screen in FIG. 4F according to the rotation display that uses the set rotation axis and the set rotation direction. Only Polaris 402 and the stars 403 around Polaris are included in the field of view also in the screen in FIG. 4F, and hence the rotation axis and the rotation direction do not change, and the display screen is changed to the screen in FIG. 4G In the screen changes among FIGS. 4E, 4F, and 4G the stars 403 around Polaris 402 revolve counterclockwise around Polaris 402.

As described thus far, according to the present embodiment, control is performed such that, based on the display target image, the rotation axis about which the celestial body included in the display target image rotates in response to the rotation of the earth is detected, and the display area of the display target image is displayed while the display area is rotated about the detected rotation axis. With this, when the display target image is the celestial sphere image of the starry sky, the image is reproduced such that the actual movement of stars can be observed, and hence the user (observer) will be impressed more deeply.

Note that, in the present embodiment, attention is focused on Polaris on the assumption of the starry sky in the Northern Hemisphere of the earth, but attention may be focused on Polaris *Australis* (Octans) on the assumption of the starry sky in the Southern Hemisphere of the earth. The CPU 201 may determine whether the image is an image captured in the Northern Hemisphere of the earth or an image captured in the Southern Hemisphere of the earth based on the display target image (based on, e.g., the result of the pattern matching for detecting the celestial body, metadata, or the like). In addition, the CPU 201 may perform the rotation display of the starry sky such that the image captured in the Northern Hemisphere rotates counterclockwise, and the image captured in the Southern Hemisphere rotates clockwise. Specifically, in Step S310, it may be determined whether Polaris or Polaris *Australis* is included in the display area. In the case where it is determined that Polaris *Australis* is included in the display area, a direction that passes through the center and Polaris *Australis* in the VR space may be set in Step S313, and the clockwise rotation direction may be set in Step S314.

Even when neither Polaris nor Polaris *Australis* is included, it is possible to detect an axis of rotation (the rotation axis about which the celestial body included in the display target image rotates in response to the rotation of the earth) based on the positional relationship of the celestial body and a shooting place (latitude and longitude). Accordingly, in the case where only the starry sky (celestial body) is included in the display area irrespective of whether or not Polaris or Polaris *Australis* is included, the rotation display that uses the axis of rotation as the rotation axis may be performed. The rotation display that uses the axis of rotation as the rotation axis may be performed irrespective of whether or not only the starry sky is included in the display area. Note that, when only the starry sky is included in the display area, it is possible to implement impressive display that is closer to a time-lapse video of the starry sky.

Attention may be focused on a characteristic star or constellation (specific star or constellation) different from Polaris and Polaris *Australis*. The field of view may be changeable in response to a user operation during the rotation display. In the rotation display of the starry sky, special effects such as an afterimage effect and the like may be added to the image.

In Step S310, it may be determined whether or not the characteristic star or constellation (e.g., Polaris, Polaris *Australis*, or the like) is included in "a predetermined area (a central part of the display area or the like)". With this, the rotation display of the starry sky is started in a state in which the characteristic star or constellation is easily seen. For example, it becomes possible to perform the rotation display of the starry sky with Polaris positioned in front of the user. Accordingly, the user will be impressed more deeply.

The characteristic star or constellation may be detected from the entire display target image, the display direction may be caused to gradually approach the direction of the detection position, and the rotation display that uses the axis of rotation as the rotation axis may be started when the detection position enters the display area. The characteristic star or constellation may be detected from the entire display target image, the display direction may be changed to the direction of the detection position at once, and the rotation display that uses the axis of rotation as the rotation axis may be started.

Note that one piece of hardware may perform the above-described various control operations that are assumed to be performed by the CPU 201 in the above description, or a plurality of pieces of hardware (e.g., a plurality of processors or circuits) may perform the control of the entire apparatus by sharing processes.

The present invention has been described in detail based on the preferred embodiments, but the present invention is not limited to the specific embodiments, and various embodiments without departing from the gist of the invention are also included in the present invention. Further, the individual embodiments described above are only illustrative of exemplary embodiments of the present invention, and the embodiments may be appropriately combined with each other.

In addition, in each embodiment described above, the description has been made by using, as an example, the case where the present invention is applied to the display apparatus, but the present invention is not limited to the example, and the present invention can be applied to any display control apparatus capable of performing control such that the image is displayed in the display unit. For example, the present invention can be applied to a personal computer, a PDA, a cellular phone terminal, a portable image viewer, a printer apparatus, a digital photo frame, a music player, a game machine, an electronic book reader, and a video player. In addition, the present invention can also be applied to a television apparatus, a projection apparatus, a tablet terminal, a smart phone, an AI speaker, a home electronic appliance, a vehicle-mounted apparatus, and medical equipment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130846, filed on Jul. 10, 2018, which is hereby incorporated by reference herein in its entirety.

What is claimed is:

1. A display control apparatus comprising at least one memory and at least one processor which function as:
   an axis detection unit configured to detect, based on an image, a rotation axis about which a celestial body included in the image as an object rotates in response to the rotation of the earth;
   a first determination unit configured to determine (1) whether or not only the celestial body is included in the display area, (2) whether or not only (a) the celestial body and (b) either Polaris or Polaris *Australis* are included in the display area, and (3) whether or not an object other than the celestial body, Polaris, and Polaris *Australis* is included in the display area; and
   a control unit configured to perform control such that a partial area of the image is displayed as a display area, and rotation display is performed by changing the display area while changing an angle corresponding to the display area around a position corresponding to the rotation axis detected by the axis detection unit,
   wherein the rotation display is an animation display that transitions so that an object in the image rotates around the rotation axis detected by the axis detection unit, and
   wherein the control unit (1) performs control such that the rotation display is performed in a case where the first determination unit determines that only (a) the celestial body and (b) either Polaris or Polaris *Australis* are included in the display area, (2) does not perform the control such that the rotation display is performed in a case where the first determination unit determines that only the celestial body is included in the display area but neither Polaris nor Polaris *Australis* is included in the display area, and (3) does not perform the control such that the rotation display is performed in a case where the first determination unit determines that the object other than the celestial body, Polaris, and Polaris *Australis* is included in the display area.

2. The display control apparatus according to claim 1, wherein the at least one memory and the at least one processor further function as a second determination unit configured to determine whether the image is an image captured in the Northern Hemisphere of the earth or an image captured in the Southern Hemisphere of the earth based on the image, and
   wherein the control unit performs control such that the rotation display in a first rotation direction is performed in a case where the second determination unit determines that the image is the image captured in the Northern Hemisphere, and the rotation display in a second rotation direction is performed in a case where the second determination unit determines that the image is the image captured in the Southern Hemisphere.

3. The display control apparatus according to claim 2, wherein the first rotation direction is a counterclockwise direction.

4. The display control apparatus according to claim 1, wherein the at least one memory and the at least one processor further function as a celestial body detection unit configured to detect the celestial body from the image by pattern matching, and
   wherein the axis detection unit detects the rotation axis based on a detection result of the celestial body detection unit.

5. The display control apparatus according to claim 1, wherein the image is at least one of a VR image, an omnidirectional image, a celestial sphere image, and an image having an image area corresponding to a field of view of not less than 160 degrees in each of an up-and-down direction and a left-and-right direction.

6. The display control apparatus according to claim 1, wherein the image is an image captured by a plurality of image sensors.

7. The display control apparatus according to claim 1, wherein the control unit performs control such that a plurality of display items corresponding to a respective plurality of animation types with different animation movements are displayed, and the rotation display is performed in a case where a specific display item is selected from the plurality of display items.

8. The display control apparatus according to claim 1, wherein the animation display is not display of a time-lapse video but is generated from the image so as to provide an impression of a time-lapse video.

9. The display control apparatus according to claim 1, wherein the image is an omnidirectional image.

10. A display control method comprising:
   detecting, based on an image, a rotation axis about which a celestial body included in the image as an object rotates in response to the rotation of the earth;
   determining (1) whether or not only the celestial body is included in the display area, (2) whether or not only (a) the celestial body and (b) either Polaris or Polaris *Australis* are included in the display area, and (3) whether or not an object other than the celestial body, Polaris, and Polaris *Australis* is included in the display area; and
   performing control such that a partial area of the image is displayed as a display area, and rotation display is performed by changing the display area while changing an angle corresponding to the display area around a position corresponding to the detected rotation axis,
   wherein the rotation display is an animation display that transitions so that an object in the image rotates around the detected rotation axis,
   wherein the control is performed such that the rotation display is performed in a case where it is determined that only (a) the celestial body and (b) either Polaris or Polaris *Australis* are included in the display area,
   wherein the control is not performed such that the rotation display is performed in a case where it is determined that only the celestial body is included in the display area but neither Polaris nor Polaris *Australis* is included in the display area, and
   wherein the control is not performed such that the rotation display is performed in a case where it is determined that the object other than the celestial body, Polaris, and Polaris *Australis* is included in the display area.

11. A non-transitory computer-readable medium that stores a program, wherein the program causes a computer to execute a method comprising:
   detecting, based on an image, a rotation axis about which a celestial body included in the image as an object rotates in response to the rotation of the earth;
   determining (1) whether or not only the celestial body is included in the display area, (2) whether or not only (a) the celestial body and (b) either Polaris or Polaris *Australis* are included in the display area, and (3) whether or not an object other than the celestial body, Polaris, and Polaris *Australis* is included in the display area; and
   performing control such that a partial area of the image is displayed as a display area, and rotation display is performed by changing the display area while changing an angle corresponding to the display area around a position corresponding to the detected rotation axis,
   wherein the rotation display is an animation display that transitions so that an object in the image rotates around the detected rotation axis,
   wherein the control is performed such that the rotation display is performed in a case where it is determined that only (a) the celestial body and (b) either Polaris or Polaris *Australis* are included in the display area,
   wherein the control is not performed such that the rotation display is performed in a case where it is determined that only the celestial body is included in the display area but neither Polaris nor Polaris *Australis* is included in the display area, and
   wherein the control is not performed such that the rotation display is performed in a case where it is determined that the object other than the celestial body, Polaris, and Polaris *Australis* is included in the display area.

* * * * *